July 10, 1945.　　　F. W. SCHWINN　　　2,379,994
BICYCLE CARRIER
Filed Nov. 19, 1943　　　2 Sheets-Sheet 1
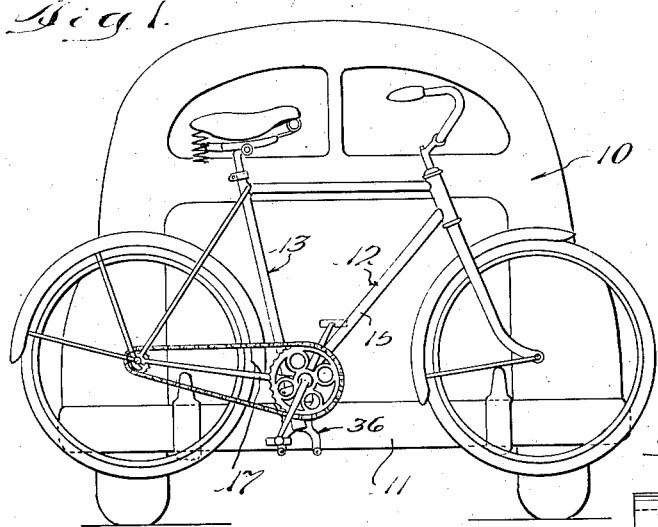
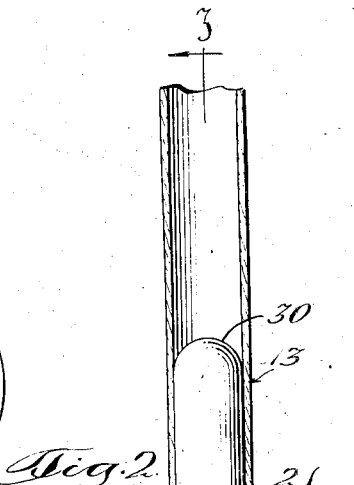
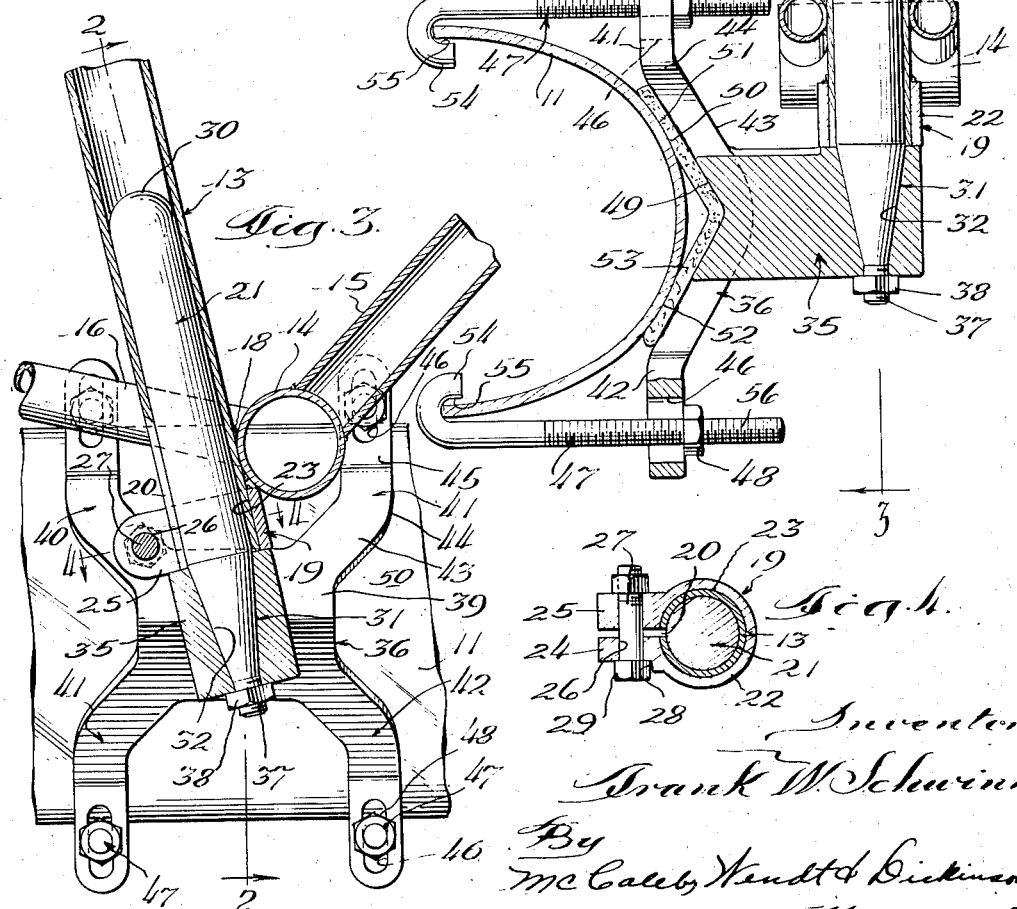
Inventor
Frank W. Schwinn
By
McCaleb, Wendt & Dickinson
Attorneys

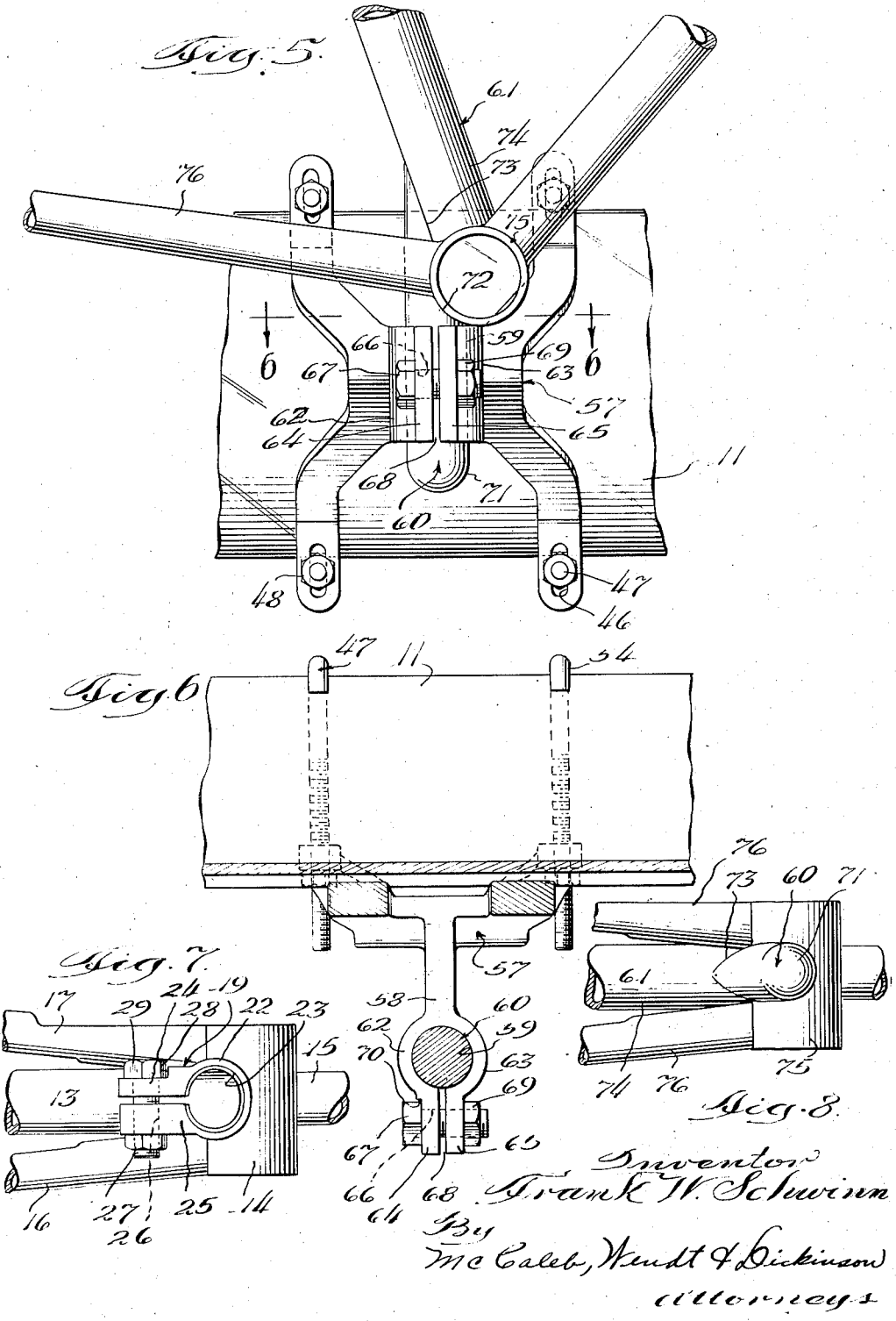

Patented July 10, 1945

2,379,994

UNITED STATES PATENT OFFICE 2,379,994

BICYCLE CARRIER

Frank W. Schwinn, Chicago, Ill.

Application November 19, 1943, Serial No. 510,875

6 Claims. (Cl. 224—29)

The present invention relates to bicycle carriers and is particularly concerned with the provision of a carrier adapted to be used for transporting a bicycle on a motor car.

One of the objects of the invention is to provide an improved carrier and bicycle, the carrier of which is adapted to be secured to the front or rear bumper of an automotive vehicle in such manner that the bicycle may be supported by means of its frame for transportation with the vehicle in such condition that it may be removed at any time ready for use.

Another object of the invention is the provision of an improved bicycle carrier for automotive vehicles which is adapted to support the bicycle at such a point that there is little or no possibility of any damage to the bicycle by reason of the jolts and jars to which it may be subjected in transportation.

Another object of the invention is the provision of an improved bicycle carrier of the class described which is adapted to be mounted on bumper bars of varying width and varying thickness or bumper bars of various conformation or cross-section.

Another object of the invention is the provision of an improved bicycle carrier adapted to engage the frame and support the bicycle from its frame in such manner that no part of the bicycle touches any part of the motor car so that neither the bicycle nor the motor car will have its finish marred nor will any part of either vehicle be damaged in any way.

Another object of the invention is the provision of an improved bicycle carrier which is simple, sturdy, and capable of being manufactured at a low cost, by means of which the bicycle may be quickly secured to the bumper for transportation or quickly released with a minimum amount of effort in condition for immediate use.

Another object of the invention is the provision of a modified construction which is adapted to be utilized with existing forms of bicycles by merely making a suitable modification of the bicycle frame.

Other objects and advantages of the invention will be apparent from the following description and the accompanying drawings, in which similar characters of reference indicate similar parts throughout the several views.

Referring to the drawings, of which there are two sheets,

Figure 1 is a rear elevational view of an automotive vehicle equipped with a bicycle carrier embodying the invention and shown in connection with a bicycle peculiarly adapted to be used with this carrier;

Fig. 2 is a fragmentary sectional view taken on the plane of the line 2—2 of Fig. 3 looking in the direction of the arrows;

Fig. 3 is a fragmentary sectional view taken on the plane of the line 3—3 of Fig. 2 looking in the direction of the arrows;

Fig. 4 is a transverse cross-sectional view taken on the plane of the line 4—4 of Fig. 3 looking in the direction of the arrows;

Fig. 5 is a fragmentary elevational view of a modification.

Fig. 6 is a fragmentary horizontal sectional view taken on the plane of the line 6—6 of Fig. 5 looking in the direction of the arrows;

Fig. 7 is a fragmentary bottom plan view of the bicycle frame used in Figs. 2 and 3, showing the location of the supporting socket on the frame.

Fig. 8 is a fragmentary bottom plan view of the bicycle frame used in Fig. 5, showing the location of the supporting stud.

Referring to Fig. 1, 10 indicates in its entirety an automotive vehicle provided with a bumper 11 and with the present invention for supporting a bicycle 12. The present bicycle differs in the construction of its frame from the usual frame structure in the position and arrangement of the seat post mast tube 13.

In Fig. 3, 14 indicates the crank shaft hanger tube which is joined by welding or other secure fastening means to the down tube 15 with the axis of the down tube preferably intersecting the axis of the hanger tube. The rear fork members 16, 17 are also secured to the crank hanger tube in the usual manner with the axis of each rear fork substantially intersecting the axis of the crank hanger tube.

The front down tube 15 is preferably located midway between the ends of the crank hanger tube while the rear fork members are spaced from each other as shown in Fig. 7 and their outer surfaces at the crank tube may be flush with the ends of the crank tube.

The main difference between this frame construction and that of the prior art lies in the fact that the seat post mast tube 13 is disposed at one side of the crank hanger tube, that is, at the rear side, as shown in Fig. 3, and is welded to the crank hanger tube as indicated at 18. The seat post mast tube is also preferably welded to both of the rear fork members 16, 17.

The seat post mast tube is longer than usual, being extended beyond the crank hanger tube sufficiently to provide space for a clamping member 19 which embraces the lower end of the seat post mast tube.

The seat post mast tube is provided on its rear side with a slot 20 so that the clamp 19 may be more effective in clamping together the end portions of that tube on a stud 21 which has a sliding fit in the tube 13 when the clamp 19 is released.

The clamp 19 may comprise a substantially cylindrical metal body 22 having a bore 23 adapted to receive the end of tube 13 and having a pair of rearwardly extending bolt lugs 24, 25. The bolt lugs 24, 25 are provided with aligned bores 26 for receiving the bolt 27. One of the lugs may be reduced in thickness, as for example the lug 24, to provide the flat shoulder 28 which engages the side of the head 29 of bolt 27 to prevent its turning when the nut is being driven home on the other end. This clamp may be permanently attached to the tube 13 by brazing, soldering, welding, or other convenient fastening means at the side which is remote from the lugs 24, 25.

The stud 21 which supports the bicycle frame may have a partially spherical or tapered end 30 so that it will be guided into the end of the tube 13 whenever it comes near alignment with the tube and it is preferably of substantial length, giving a long bearing surface in the tube and provided with a tapered frusto-conical end portion 31 at its lower end. This tapered portion 31 may fit in a complementary frusto-conical bore 32 located in the rearwardly extending arm 35 of a supporting bracket 36.

The extreme lower end of the stud 21 is reduced in size and threaded as at 37 so that the nut 38 may draw the tapered portion 31 tightly into the bore 32 to secure these parts together.

The stud supporting arm 35 may consist of an integral part of the bracket 36 and the bracket 36 may comprise a cast metal member, or in some embodiments of the invention the body of the bracket 36 may be made of sheet metal having the arm 35 welded thereto.

The bracket 36 is preferably provided with a substantially rectangular body 39 having a plurality, preferably four, of radially extending arms 40—42 for attachment to the bumper of a car. For example, each arm preferably has the radially extending portion 43 but at the point 44 the arms are bent upwardly or downwardly, as the case may be, being provided with a substantially vertical outer end portion 45.

The outer end portion 45 of each arm is provided with an elongated slot 46 adapted to receive the threaded end of a hook bolt 47 which may be secured by means of nut 48. The use of the slots 46 makes the bracket 36 of adjustable width in a vertical direction so as to be adaptable for use on bumpers of different width.

By using the diagonally extending portions 43, the arms of the bracket 36 are given a greater spread, thereby increasing their stability and the arms are spread far enough upon a small body 39 to provide room for the crank hanger tube and seat post mast tube when they are arranged as shown.

The central body portion 39 of the bracket 36 is preferably bent outwardly to give it a substantially V-shaped inner surface 49 which is adapted to engage the curved surface 50 of a bumper at a point 51 toward the top of the bracket and a point 52 toward the bottom of the bracket.

The stud supporting arm 35 may be substantially rectangular in cross-section and it is disposed at such an angle with respect to the vertical axis of the bracket 36 that the bicycle 12 is held in horizontal position when the bracket is secured to a bumper.

In order to prevent the marring of the bumper, the V-shaped recess 49 in the bracket 36 may be covered with a cushion 53 of sheet material of sufficient width to cover both lines of contact of the bracket and bumper, such as for example, a rubber cushion.

The hook bolts 47 are four in number and each of these hook bolts comprises a rod which is formed at its inner end with a hook 54 having a generously wide groove or recess 55 so that it may be hooked on bumpers of thick or thin material and each bolt has a threaded end portion 56. The bolts 47 are threaded over substantially their full length and are of extra length so that they may be used on bumpers which are thin from front to back, or bumpers which are relatively thick or wide from front to back.

Referring to Figs. 5 and 6, these figures show a modification in which the bracket 57 is provided with a load supporting arm 58 having a substantially cylindrical socket 59 for receiving a stud 60 that is carried by the bicycle frame at 61. The bracket socket 59 is formed by two half cylindrical arms 62, 63 which have rearwardly extending bolt lugs 64, 65, provided with aligned bores 66 for receiving the bolt 67.

Bolt lugs 64, 65 are spaced from each other, leaving a slot 68 so that the clamp having the socket 59 may be firmly secured on the stud 60 by tightening the nut 69. Here again the lug 64 is preferably provided with a shoulder 70 for engaging the side of the head 67 to prevent its rotation. The sockets 59 of this clamp in this case extend vertically since the stud 60 may be attached to the frame of the bicycle so that it is in vertical position when the wheels are at substantially the same level.

All of the other details of construction of the bracket body 57 may be substantially the same as the bracket 36 previously described.

The stud 60 may comprise a substantially cylindrical metal member such as a solid steel shaft having its lower end provided with a partially spherical or tapered surface 71 for the same purpose as surface 30 on stud 21. Stud 60 has its upper end provided with a cylindrically curved surface at 72 for fitting against the side of the crank hanger tube 75 and with a diagonally upwardly and rearwardly extending cylindrical groove 73 for fitting against the side of the seat post mast tube.

The stud 60 may be welded to the seat post mast tube 74 and to the hanger tube 75 so that it is rigidly and permanently secured to the bicycle frame 61. Stud 60 is also preferably welded to the inside of the two rear fork members 76.

The operation of the present bicycle carrier is substantially as follows: In the embodiment of Fig. 2, the clamp 19 may be released and the bracket 36 separated from the bicycle until the bracket has been secured to the bumper. A position should be selected on the bumper which is adapted to hold the bicycle practically in centered position with respect to the width of the vehicle, but some may prefer to move the bracket slightly toward the right so that the bicycle does not project at the left side of the vehicle where cars going in the opposite direction might engage it. Others may prefer to let the bicycle project at the left side and may take care in driving to give any vehicles going in the opposite direction a wide clearance.

The bracket 36 may be tightly secured on the bumper by means of the hook bolts 47 and then the bicycle may be mounted on the stud 21 by having its seat post mast tube 13 receive the stud. The clamp 19 may be tightened and thus the bicycle frame is firmly secured to the bracket and to the bumper in such manner as to support the bicycle in substantially horizontal position.

When it is desired to use the bicycle, the user has only to release the clamp 19 and lift off the bicycle and it is ready for immediate use.

In some bicycle constructions, the steering post may be provided with a lock which will prevent the steering post from rotating during transportation. If desired, bicycles not equipped with such a lock may have a tension member, such as a spring, passed through between the spokes of the front wheel and drawn back until it can have both its ends hooked on the pedals or cranks to prevent the front wheel assembly from turning on the steering post.

The proximity of the bumper, however, which would otherwise engage the front tire, will prevent any substantial rotation of the front wheel assembly on its steering post.

Referring to the modification of Fig. 5, this device operates in substantially the same way, except that in this case the clamp is carried by the bumper bracket and the stud is carried by the frame. In either case the stud carried by the frame or the clamp carried by the frame is small enough and is so located so that it does not interfere with the user of the bicycle.

It will thus be observed that I have invented an improved bicycle carrier by means of which the bicycle may be fixedly secured on the bumper of an automotive vehicle so that it is ready for immediate use and it may be quickly attached or removed with a minimum of effort.

The present carrier supports the bicycle by means of its strongest part, that is, the frame, and it is located substantially in line with the center of gravity of the bicycle or as close to this position as can be attained while still making a firm attachment to the frame.

The present carrier is adapted to be used with bumpers of varying thickness and varying width and holds the bicycle on the bumper of the motor car in such manner that it avoids marring or damaging of any part of either the motor car or bicycle. None of the parts of the bicycle need have their adjustment disturbed in mounting the bicycle on the car or dismounting it, and the bicycle is immediately ready to be ridden when the clamp which holds it has been released and the bicycle has been lifted off the bracket.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a bicycle carrier the combination of a bicycle frame having a seat post mast tube provided with an open socket at its lower end, a bracket member adapted to be fixedly secured to an automobile bumper, said bracket having a stud adapted to fit in said socket, and clamping means for securing the stud in the socket.

2. In a bicycle carrier the combination of a bicycle frame having a seat post mast tube provided with an open socket at its lower end, a bracket member adapted to be fixedly secured to an automobile bumper, said bracket having a stud adapted to fit in said socket, and clamping means for securing the stud in the socket, said stud being carried by an outwardly extending arm secured on said bracket whereby the stud is spaced sufficiently from the bumper to prevent interference between any part of the bicycle and the body of the automobile.

3. In a bicycle carrier the combination of a bicycle frame having a seat post mast tube provided with an open socket at its lower end, a bracket member adapted to be fixedly secured to an automobile bumper, said bracket having a stud adapted to fit in said socket, and clamping means for securing the stud in the socket, said bracket being provided with a body having upwardly and downwardly extending arms and said arms being slotted to receive hook bolts for engaging the edges of bumpers of varying width.

4. In a bicycle carrier the combination of an automobile bumper having a convex outer surface with a bracket of substantially V-shape having upwardly and downwardly extending slotted arms, said bracket being provided with a hook bolt in each of its arms adapted to hook over the edge of the bumper, said hook bolts having nuts for securing the bracket on the bumper, an outwardly projecting arm carried by the bracket and means carried by said arm for removably securing a bicycle frame to the arm at substantially the vertical axis passing through the center of gravity of the bicycle, said means including a stud carried by said arm and a socket formed in the lower end of the seat post mast tube.

5. In a bicycle carrier for automobile bumpers, the combination of a V-shaped clamping member having a plurality of upwardly and downwardly extending arms, said arms being provided with elongated apertures to provide accommodation to bumpers of different width, and the V-shaped portion of said clamp being adapted to receive a curved section of a bumper, a plurality of hook bolts comprising one hook bolt in each aperture, and said hook bolts having hooks for engaging the edges of the bumper, and threaded means for drawing the hook bolt and clamping member tight on the bumper, an outwardly projecting arm carried by said clamping member, said arm having an aperture for receiving a shank, and a holding member carried by said arm and adapted to be received in a socket carried by the bicycle frame, and a bicycle frame, said bicycle frame having a downwardly extending socket which is split to permit clamping action, and means for clamping said socket on said holding member.

6. In a bicycle carrier for automobile bumpers, the combination of a V-shaped clamping member having a plurality of upwardly and downwardly extending arms, said arms being provided with elongated apertures to provide accommodation to bumpers of different width, and the V-shaped portion of said clamp being adapted to receive a curved section of a bumper, a plurality of hook bolts comprising one hook bolt in each aperture, and said hook bolts having hooks for engaging the edges of the bumper, and threaded means for drawing the hook bolt and clamping member tight on the bumper, an outwardly projecting arm carried by said clamping member, said arm having an aperture for receiving a shank, and a holding member carried by said arm and adapted to be received in a socket carried by the bicycle frame, and a bicycle frame, said bicycle frame having a downwardly extending socket which is split to permit clamping action, and means for clamping said socket on said holding member, said shank being tapered to fit a tapered bore in said outwardly projecting arm, and threaded means for drawing said shank into said bore.

FRANK W. SCHWINN.